United States Patent
Noble et al.

(10) Patent No.: US 9,471,757 B2
(45) Date of Patent: Oct. 18, 2016

(54) RADIO FREQUENCY IDENTIFIERS FOR PROVIDING USER ACCESS TO COMPUTING RESOURCES

(75) Inventors: Gayle L. Noble, Boulder Creek, CA (US); Anna Yin, San Jose, CA (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 1705 days.

(21) Appl. No.: 12/236,802

(22) Filed: Sep. 24, 2008

(65) Prior Publication Data

US 2009/0089885 A1 Apr. 2, 2009

Related U.S. Application Data

(60) Provisional application No. 60/977,012, filed on Oct. 2, 2007.

(51) Int. Cl.
| | |
|---|---|
| *G06F 21/12* | (2013.01) |
| *H04N 7/173* | (2011.01) |
| *H04N 21/258* | (2011.01) |
| *H04N 21/4363* | (2011.01) |
| *H04N 21/475* | (2011.01) |
| *H04N 21/6377* | (2011.01) |

(52) U.S. Cl.
CPC ........ *G06F 21/123* (2013.01); *H04N 7/17309* (2013.01); *H04N 21/25875* (2013.01); *H04N 21/43637* (2013.01); *H04N 21/4758* (2013.01); *H04N 21/63775* (2013.01)

(58) Field of Classification Search
USPC ............... 705/50–59; 726/26–33; 370/328
See application file for complete search history.

(56) References Cited

U.S. PATENT DOCUMENTS

| | | | |
|---|---|---|---|
| 6,603,977 B1 * | 8/2003 | Walsh et al. | 455/456.1 |
| 2004/0139027 A1 * | 7/2004 | Molaro | 705/59 |
| 2005/0122211 A1 * | 6/2005 | Yoshigi et al. | 340/10.1 |
| 2006/0277312 A1 * | 12/2006 | Hirsch | 709/229 |
| 2007/0086372 A1 * | 4/2007 | Lee et al. | 370/328 |
| 2008/0313744 A1 * | 12/2008 | Nakajima et al. | 726/28 |

* cited by examiner

*Primary Examiner* — Tsan-Yu J Huang
(74) *Attorney, Agent, or Firm* — Mannava & Kang, P.C.

(57) ABSTRACT

A system for controlling access to computing resources including an authentication device operatively associated with a computing device, the authentication device being configured to transmit an interrogation signal to a predetermined area. A computing device has at least one software application resides thereon. A wireless license device is configured to transmit license information to the authentication device in response to the interrogation signal and to allow the software application to run while the wireless license device is within the predetermined area and to prevent the software application from running when the wireless license device is not within the predetermined area.

20 Claims, 2 Drawing Sheets

RADIO FREQUENCY IDENTIFIERS FOR PROVIDING USER ACCESS TO COMPUTING RESOURCES

RELATED APPLICATIONS

The present application claims the benefit of U.S. Provisional Patent Application Ser. No. 60/977,012 filed Oct. 2, 2007, which is hereby incorporated by reference in its entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations.

Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

There has also been a corresponding increase in network links within the network as the networks grow. Monitoring devices are sometimes used to monitor the network traffic across the network links. Software is often used to control the operation of the monitoring devices. Frequently, the software providers wish to control the use of the software used to monitor devices. In particular, in some cases, the software provider issues a number of licenses. The number of licenses may correspond with the number of monitoring devices on which the software may run within the system. For example, when a monitoring device is in operation, the software will be loaded. Once the maximum number of licenses is used, in order to use a different monitoring device, the software must be disabled on one or more monitoring device. The selected monitoring device may then load the software to monitor the network link. While such an approach may allow software provider to control the distribution and/or use of their software, such an approach may be cumbersome for the users.

BRIEF SUMMARY OF THE INVENTION

A system for controlling access to computing resources including an authentication device operatively associated with a computing device, the authentication device being configured to transmit an interrogation signal to a predetermined area. A computing device has at least one software application resides thereon. A wireless license device is configured to transmit license information to the authentication device in response to the interrogation signal and to allow the software application to run while the wireless license device is within the predetermined area and to prevent the software application from running when the wireless license device is not within the predetermined area.

In a computing environment, a method of controlling access to computing resources can include sending an interrogation signal to at least one selected area, receiving license information in an authentication device from a wireless license device while the wireless license device is within the selected area, determining whether the license information licenses a software application to run on a computing device, allowing the software application to run while the authentication device receives license information that licenses the operation of the software application on the computing device, and disallowing operation of the software application if the authentication device does not receive license information that licenses the operation of the software application on the computing device.

A computer readable medium having instructions thereon, the instructions including a license management module configured to receive license information from a wireless license device while the wireless license device is located within a selected area, to access license information associated with a computing resource, compare the license information from the wireless license device to the license information associated with the computing resources to determine whether the license information is valid. A monitoring module can be configured to allow access to the computing resource if the license management module is receiving the license information from the wireless license device and the license information from the license device is valid.

BRIEF DESCRIPTION OF THE DRAWINGS

To further clarify certain aspects of the present invention, a more particular description of the invention will be rendered by reference to specific embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF EXAMPLE EMBODIMENTS

Devices, systems and methods are provided herein for providing access to computing resources automatically. Computing resources can include computing resources residing on computing devices and/or hardware devices. For ease of reference, computing resources will be described in many examples as residing on computing devices. It will be appreciated that the computing resources can include hardware as well. In at least one example, the access is provided automatically when a licensing device is brought into proximity with the computing device. The proximity may be controlled to within a predetermined distance. In at least one example, the computing device may include a network device, such as a monitoring device. Further, the computing resources that may be controlled may include software applications used in controlling the network device, such as monitoring software or modules.

Systems may control use of the network devices through the use of a reader and a radio frequency identification tag. In particular, in at least one example, the reader may be operatively associated with the network device while the radio frequency identification tag may be secured to or be part of a mobile device, such as a card. The locking and unlocking of the monitoring module may be done automatically when the RF license device is brought within or taken from out of the predetermined distance.

Accordingly, the system may be configured to automatically allow access to computing devices with the RF license device based on proximity. Such a configuration may allow a software provider to provide a system in which a user is able to conveniently move between computing devices while helping ensure the use of computing resources on the computing devices is properly licensed.

In at least one example, the RF license device may be provided as part of a card or other similarly portable article. Such a configuration may allow a user to readily carry the article, such as around various parts of a network. Consequently, the user with the article may be able to readily move between computing devices as desired.

Figure 1:
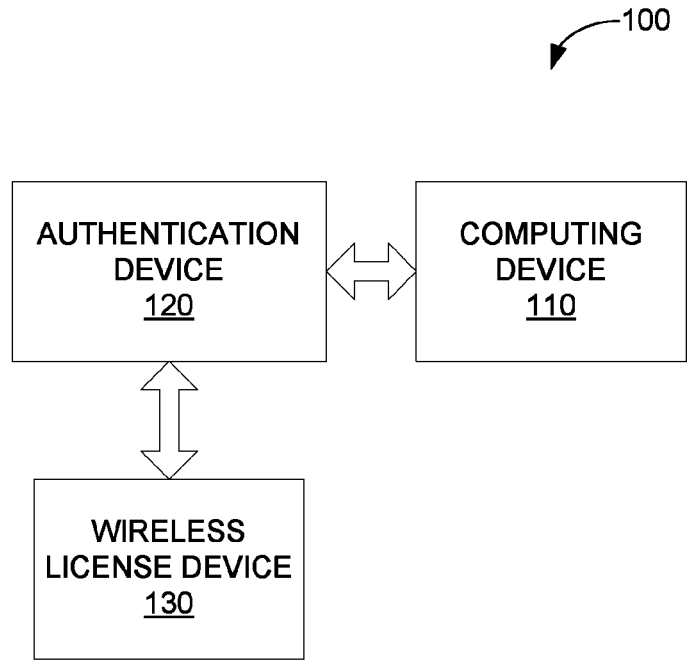
FIG. 1 is a schematic diagram of a system controlling access to computing resources on a computing device according to one example.

FIG. 1 is a schematic diagram of a system 100 that includes a computing device 110, such as a network device. For convenience, the computing device 110 will be described and referenced as a monitoring device, though the control and/or authentication described herein with reference to the computing device 110 may be applied to other computing devices and/or other applications.

In at least one example, the system 100 includes an authentication device 120 operatively associated with the computing device 110. The authentication device 120 is further operatively associated with a personal wireless license device (hereinafter referred to as wireless license device 130).

The wireless license device 130 may include license information stored thereon. For example, license information stored on the wireless license device 130 may include unique license information related to a specific license or group of licenses related to one or more software applications that may reside on the computing device 110.

In at least one example, the authentication device 120 and/or the software applications may include a license management feature that may help ensure that use of the software application is properly licensed and to prevent use of the software application if use of the software application is not properly licensed. The unique license information stored on the wireless license device 130 may include a key configured to unlock the licensing features to thereby allow a user to use the computing device 110.

More specifically, in at least one example, the authentication device 120 is configured to interact with the wireless license device 130 when the wireless license device 130 is within a predetermined distance. The predetermined distance can have any desired range, such as a distance of up to about 150 feet or more. While the wireless license device 130 is within the predetermined distance, the authentication device 120 is configured to receive the license information.

The authentication device 120 may then analyze the license information to determine which, if any, software applications should be unlocked using the license information. For example, the authentication device 120 may also include additional license information for one or more software application. The authentication device 120 may compare the information received from the wireless license device 130 to the additional license information. If the information from the wireless license device 130 matches the additional license information, the authentication device 120 may unlock the software on the computing device 110. Accordingly, the wireless license device 130 interacts with other components within range to unlock software.

In at least one example the authentication device 120 is configured to interact with the wireless license device 130 when the wireless license device 130 is within a predetermined range. The range may vary from several centimeters around a computing device to several meters or more within a room or desired area, such as a laboratory or other area. While the wireless license device 130 is within the predetermined range, the wireless license device 130 will interact with the authentication device 120 to the license management features unlocked to thereby allow the software application to run to thereby control and operate the computing device 110.

If the wireless license device 130 is taken out of the predetermined range, the authentication device 120 is no longer able to communicate with the wireless license device 130. Once communication between the authentication device 120 and the wireless license device 130 is interrupted, the license management features on the authentication device 120 and/or the computing device 10 lock the software application to prevent further operation of the computing device 110.

In at least one example, the software application may be locked at any point during the operation of the software application. Such a configuration may allow an administrator to readily move between computing devices. In particular, the wireless license device 130 may be readily portable and further may unlock the software application as described above by being brought into proximity to the computing device 110 and then lock the software application as the user moves away from the computing device 110.

Accordingly, in at least one example a user may have the wireless license device 130 on her person to automatically activate software applications on computing devices that the user is accessing. Such a configuration may increase the convenience of using software applications while helping ensure the software applications that are running within a network are properly licensed.

Figure 2A:
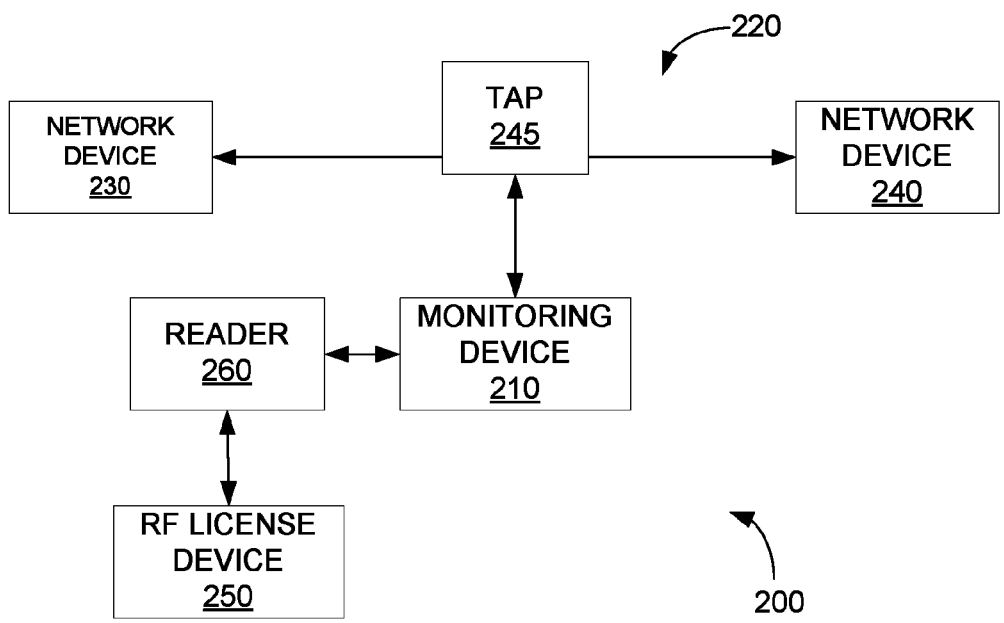
FIG. 2A a schematic diagram of a system for controlling access to a network device, such as a monitoring device.

As previously introduced, the system may include radio frequency identification components. FIG. 2A is a schematic diagram illustrating a system 200 configured to control a monitoring device 210 by controlling software residing thereon. In the example illustrated in FIG. 2A, the monitoring device 210 is configured to monitor a link 220 between two or more network devices 230 and 240. In the illustrated example, the monitoring device 210 accesses the network link 220 by way of a traffic access port 245 to thereby direct a copy of the traffic flowing over the link 220 to the monitoring device 210.

As illustrated in FIG. 2A, the system 200 may include a radio frequency (RF) license device 250 that communicates with a reader 260. As will be discussed in more detail below, the RF license device 250 and the reader 260 may interact to help ensure that software running on the monitoring device is properly licensed. A single monitoring device 210 is illustrated. The RF license device 250 may control access to several monitoring devices, such as monitoring devices which are running software applications that are subject to a group license agreement. Further, while an RF license device 250 is described, other types of wireless devices may also be used to control more than one monitoring device.

Probes or other monitors may be devices that are connected (either directly or indirectly) to the network. Each of these data probes preferably monitor the physical data present on the network medium and, in a preferred embodiment, generate discrete intervals of data. The probes then analyze these data intervals, and identify specific "attributes" of the network data. These attributes can be certain characteristic or statistic information that relates to the monitored network data. These attributes are generated in the form of "metrics," which are discrete data units. For example, in an SAN environment, each metric is "storage I/O" centric, and contain attributes of multi-interval storage I/O transactions between devices on the network. In addition, the metrics may contain attributes of instantaneous events that may occur on the network.

Metrics may be generated at the data probes in substantially real time; that is, the probes are able to continuously generate metric information about the network traffic as fast as the traffic occurs within the network. In at least one example, the probe accesses the network traffic by way of a portal. The portal may be implemented in software on a host computing device computing device. As will be discussed in more detail below, the RF license device 250 may unlock monitoring devices based on proximity.

Figure 2B:
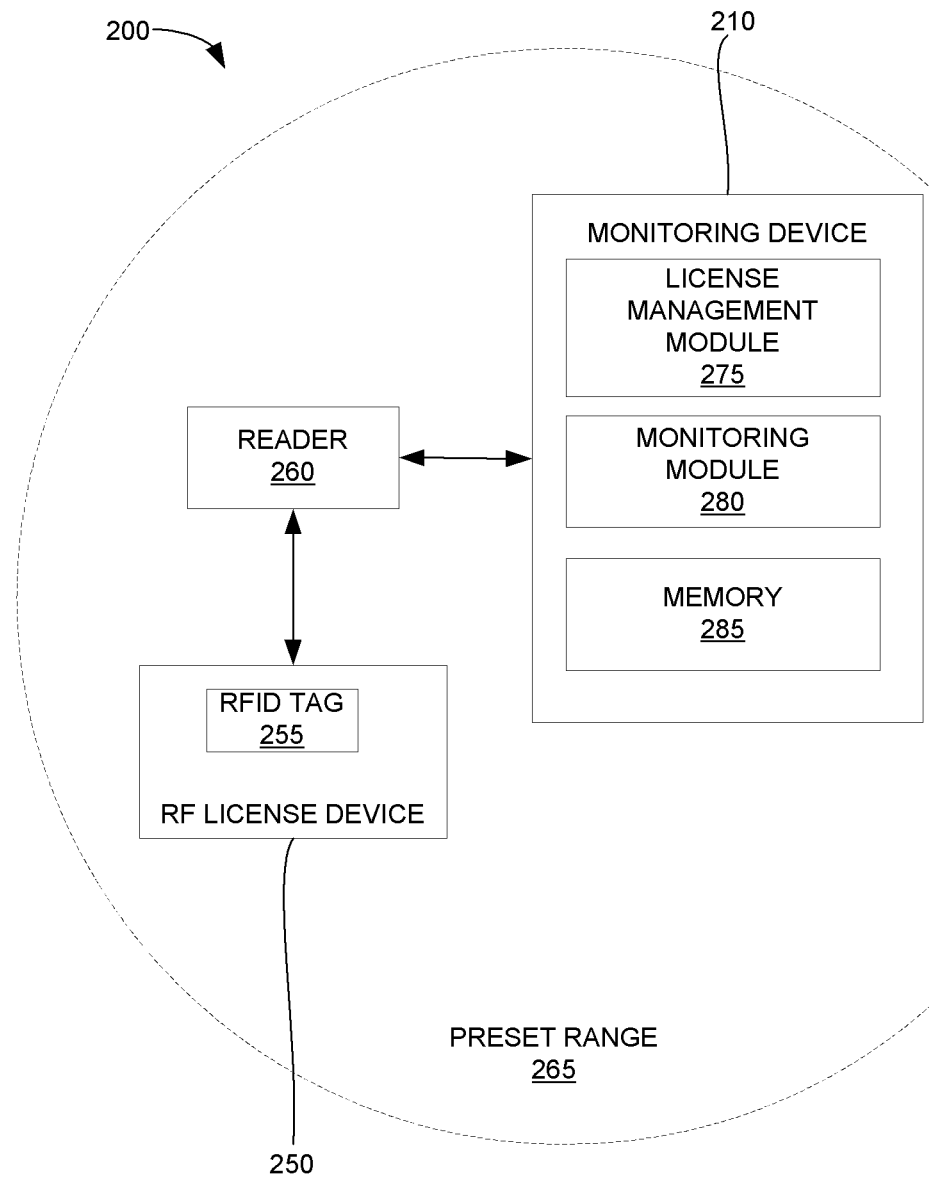
FIG. 2B is a schematic diagram of a system for controlling access to a network device, such as a monitoring device according to yet another example.

FIG. 2B is a schematic diagram illustrating an interaction between a monitoring device 210, an RF license device 250, and a reader 260. The RF license device 250 includes an RFID tag 255. The RFID tag 255 receives a radio frequency transmission from the reader 260 and transmits information to the reader 260 in response to receipt of the radio frequency transmission.

The RFID tag 255 may be active or passive. If the RFID tag 255 is passive, the RFID tag 255 is powered by the radio frequency transmission. If the RFID tag 255 is active, the RFID tag 255 includes an internal power source. In either case, the power discussed above may be used to allow the RFID tag 255 to transmit one or more parameters associated with the monitoring device 210 to the reader 260. Such parameters may include information that may be used to unlock computing resources, such as software applications, hardware, and/or hardware functions. Hardware can include, without limitation, probes, blades in a switch, ports in a switch while hardware functions can include those performed in an analyzer or other type of device. These parameters may include information related to license information, such as serial numbers, device type, device manufacturer, or other unique identifying characteristics.

One or more readers 260 may communicate with any number of RFID tags 255. In at least one example, readers are located in selected areas to control access to the monitoring devices 210 in that area. In other examples, the reader 260 may be coupled to other network devices that interact with the monitoring device 210. In other examples, the reader 260 may be separately located. Accordingly, the reader 260 may have various configurations. In any case, the reader 260 is configured to receive device parameters from the RFID tag 255.

The size of each area may cover a predetermined distance 265. The predetermined distance may correspond to areas of varying sizes such as different labs, separate buildings and/or other different locations. In any case, the reader 260 may be configured to transmit a signal, such as an interrogation signal, within the predetermined distance 265.

The interrogation signal may be a signal that instructs an RFID tag 255 within the RF license device 250 to transmit license information back to the reader 260. For example, the interrogation signal may cause the RFID tag 255 to transmit unique license information, such as a serial number or other unique license information back to the reader 260. The RFID tag 255 may also transmit other parameters back to the reader 260 as desired.

The reader 260 may be configured to continuously transmit an interrogation signal to the area surrounding the entry and exit points, if it is desired to allow access to monitoring devices within the area with a single RF license device 250. The interrogation signal may be transmitted such that as a network device 210 passes the entry/exit location, such as when the network device 210 is brought into or out of the area, the RFID tag 255 communicates with the reader 260 as discussed above.

In any case, when the RF license device 250 comes into the predetermined distance 265, the RF license device 250 responds to an interrogation signal sent by the reader 260 by transmitting a RF communication. The reader 260 receives the RF communication and converts the RF communication to data in a format that the monitoring device 210 is able to process.

In at least one example, the data is directed to a license management module 275. The license management module 275 is configured to analyze the data to determine whether the monitoring device 210 should be allowed access to computing resources, such as a software application or module, which may include a monitoring module 280.

In particular, the license management module 275 may be configured to access license information residing on the device, such as in memory 285 or elsewhere. The license management module 275 may then compare the license information to the data received from the reader 210. From the comparison the license management module 275 may determine that the RF license device 250 is valid and/or authentic and thus that use of the monitoring module 275 or other computing resources is properly licensed.

The license management module 275 may notify the monitoring module 280 that the license corresponding to the RF license device 250 is valid and thus that the monitoring module 280 should be allowed to run. In some examples, the license management module 275 may be part of the monitoring module 280. In other examples, the license management module 275 may be separate from the monitoring module 280.

In either case, the license management module 275 and the monitoring module 280 may interact in a lock and key type configuration in which the license management module 275 unlocks the monitoring module 280. The license management module 275 may unlock the monitoring module 280 while the license management module 275 is able to communicate with the RF license device 250 and validate and/or authenticate the information received from the RF license device 250.

As previously introduced, communication between the RF license device 250 and the reader 260 may be confined to a predetermined distance 265. While the RF license device 250 is within the predetermined distance 265, the reader 260 is able to interact with the RF license device 250 to allow the license management module 275 to unlock the monitoring module 280 and thereby allow the monitoring module 280 to run while ensuring the monitoring module 280 is properly licensed. When the RF license device 250 is taken from the predetermined distance 265, the reader 260 will stop receiving RF communications, which stops the transmission of data to the license management module 275.

The license management module 275 may then notify and/or lock the monitoring module 280. If the RF license device 250 is taken to another similarly configured computing device, such as another monitoring device, the RF license 250 may allow a user to unlock the monitoring module 280 or other computer resources in a similar manner. Similarly, the RF license device 250 may unlock the monitoring device 210 when the RF license device 250 is brought within the predetermined distance 265.

The locking and unlocking of the monitoring module 265 may be done automatically when the RF license device 250 is brought within or taken from out of the predetermined distance. Accordingly, the system 200 may be configured to automatically allow a user access to computing resources based on proximity of the RF license device 250. Such a configuration may allow a software provider to provide a system in which a user is able to conveniently move between computing devices while helping ensure the use of computing resources on the computing devices is properly licensed.

In at least one example, the RF license device 250 may be provided as part of a card or other similarly portable article. Such a configuration may allow a user to readily carry the article, such as around various parts of a network. Consequently, the user with the article may be able to readily move between computing devices as desired.

In at least one example, once the monitoring module 280 is unlocked as described above the monitoring module in turn can unlock other computing resources. For example, the monitoring module can unlock additional computing resources such as software applications, hardware, and/or hardware functions. Hardware can include, without limitation, probes, blades in a switch, ports in a switch while hardware functions can include those performed in an analyzer or other type of device.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein can be implemented as objects or processes that execute on the computing system (e.g., as separate threads). While the system and methods described herein are preferably implemented in software, implementations in hardware or a combination of software and hardware are also possible and contemplated. In this description, a "computing entity" can be any computing system as previously defined herein, or any module or combination of modulates running on a computing system.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for controlling access to computing resources including:
   a reader to continuously transmit a wireless interrogation signal to a predetermined area;
   a computing device, disposed within the predetermined area, operatively associated with the reader and having a software application residing thereon;
   a portable wireless license storage device, remote from the reader and the computing device, wherein the portable wireless license storage device is to continuously transmit license information wirelessly to the reader in response to receipt of the continuously transmitted wireless interrogation signal when within the predetermined area and to cease transmission of the license information in response to a cessation in the receipt of the wireless interrogation signal from the reader, and
   an authentication computing device to receive the continuously transmitted license information from the portable wireless license storage device, to determine if the received license information is valid, to allow the software application to run while valid license information is continuously received, and to prevent or disallow the software application from running when the license information is not continuously received or invalid license information is received.

2. The system of claim 1, wherein the portable wireless license storage device includes a radio frequency identification (RFID) tag and wherein the reader is to continuously transmit an RF interrogation signal.

3. The system of claim 2, wherein the reader is to receive radio frequency communications from the RFID tag, wherein the radio frequency communications include the license information.

4. The system of claim 1, wherein computing device is a network device.

5. The system of claim 4, wherein the network device is a monitoring device to monitor network traffic flowing over at least one network link.

6. The system of claim 2, wherein the RFID tag is contained within a portable card.

7. The system of claim 1, wherein the portable wireless license storage device includes the license information stored thereon.

8. The system of claim 7, wherein the license information includes unique license information related to a specific license or group of licenses associated with the software application.

9. The system of claim 1, wherein at least one of the portable wireless license storage device or the software application includes a license management feature to ensure that use of the software application is licensed and to prevent use of the software application if use of the software application is not properly licensed.

10. The system of claim 9, wherein the license management feature includes unique license information stored on the portable wireless license storage device has a key configured to unlock the licensing features to thereby allow a user to use the computing device.

11. The system of claim 1, wherein the predetermined area has a radius of up to about 150 feet.

12. The system of claim 1, wherein the predetermined area covers a lab.

13. In a computing environment, a method of controlling access to computing resources, comprising:
continuously sending a wireless interrogation signal to at least one selected area;
continuously receiving license information in an authentication computing device from a portable wireless license device, which is remote from the authentication computing device and the computing resources, wherein the portable wireless license device is to continuously transmit the license information in response to receipt of the continuously transmitted wireless interrogation signal and to cease transmission of the license information in response to a cessation in the receipt of the wireless interrogation signal;
determining whether the license information is valid and licenses a software application to run on a computing device;
allowing the software application to run while the authentication computing device continuously receives valid license information that licenses the operation of the software application on the computing device; and
preventing or disallowing operation of the software application on the computing device in response to a cessation in the continuous receipt of the license information.

14. The method of claim 13, wherein continuously sending the wireless interrogation signal further comprises continuously sending a radio frequency interrogation signal and wherein continuously receiving license information in an authentication computing device from a portable wireless license device further comprises continuously receiving the license information from a radio frequency identification (RFID) tag on the portable wireless license device, wherein the RFID tag is activated by the radio frequency interrogation signal.

15. The method of claim 14, wherein receiving the license information includes receiving unique license information.

16. The method of claim 15, wherein the selected area has a radius of between up to about 150 feet from the authentication computing device.

17. The method of claim 13, wherein the computing device is a probe or a rover.

18. A computing device comprising:
a processor;
a memory on which is stored computer-executable instructions that are to cause the processor to:
determine whether license information is continuously being received from a reader, wherein the reader is to continuously transmit a wireless interrogation signal to a predetermined area and wherein a portable wireless license device is to continuously transmit license information to the reader in response to continuous receipt of the wireless interrogation signal;
in response to a determination that license information is continuously being received from the reader,
determine whether the license information is valid;
allow a software application to run on the computing device in response to a determination that the license information is valid; and
disallow the software application from running on the computing device in response to a determination that the license information is invalid; and
in response to a determination that license information is not continuously being received from the reader, disallow the software application from running on the computing device.

19. The computing device of claim 17, wherein the software application comprises a monitoring application that is to monitor network traffic flowing over at least one network link.

20. The computing device of claim 17, further comprising the reader.

* * * * *